US012643296B2

(12) United States Patent
Chauvin et al.

(10) Patent No.: US 12,643,296 B2
(45) Date of Patent: Jun. 2, 2026

(54) FACILITY AND METHOD FOR PAIRING A SHIELD TO A PREFORM FOR THE PRODUCTION OF AN AIRCRAFT TURBINE ENGINE VANE

(71) Applicant: SAFRAN, Paris (FR)

(72) Inventors: Thierry Patrick Chauvin, Moissy-Cramayel (FR); Benoit Bazin, Moissy-Cramayel (FR); Adrien Touze, Moissy-Cramayel (FR)

(73) Assignee: SAFRAN, Paris (FR)

( * ) Notice: Subject to any disclaimer, the term of this patent is extended or adjusted under 35 U.S.C. 154(b) by 42 days.

(21) Appl. No.: 18/690,597

(22) PCT Filed: Sep. 14, 2022

(86) PCT No.: PCT/FR2022/051725
§ 371 (c)(1),
(2) Date: Mar. 8, 2024

(87) PCT Pub. No.: WO2023/041870
PCT Pub. Date: Mar. 23, 2023

(65) Prior Publication Data
US 2024/0416594 A1      Dec. 19, 2024

(30) Foreign Application Priority Data

Sep. 17, 2021      (FR) ...................................... 2109780

(51) Int. Cl.
*B29C 65/00*          (2006.01)
*B29C 65/48*          (2006.01)
(Continued)

(52) U.S. Cl.
CPC .............. *B29C 66/95* (2013.01); *B29C 65/48* (2013.01); *B29C 66/742* (2013.01); *B29D 99/0025* (2013.01); *B29L 2031/082* (2013.01)

(58) Field of Classification Search
CPC ... B29C 66/742; B29C 66/95; B29C 66/1412; B29C 66/1467; B29C 66/48;
(Continued)

(56) References Cited

U.S. PATENT DOCUMENTS 12,203,389 B2 *   1/2025   Touze ................... B29C 70/24
2018/0111332 A1   4/2018   Collis et al.

OTHER PUBLICATIONS

International Search Report received for PCT Patent Application No. PCT/FR2022/051725, mailed on Jan. 26, 2023, 6 pages (2 pages of English Translation and 4 pages of Original Document).

* cited by examiner

*Primary Examiner* — James D Sells
(74) *Attorney, Agent, or Firm* — Womble Bond Dickinson (US) LLP

(57)          ABSTRACT
A facility for pairing a metal shield to a leading edge of a preform made of composite material for the production of an aircraft turbine engine blade, the facility including a support configured to receive and hold the metal shield, —a movement hexapod which carries the support and is able to move the support along and about the three axes of an XYZ coordinate system, —an automaton which includes jaws and is configured to receive and hold the preform, and —a computing unit for controlling the hexapod and the automaton with a view to producing the pairing. The invention also relates to a method for pairing the metal shield to the leading edge of the preform made of composite material for the production of the aircraft turbine engine blade.

15 Claims, 8 Drawing Sheets

(51) Int. Cl.
    *B29D 99/00*        (2010.01)
    *B29L 31/08*        (2006.01)

(58) Field of Classification Search
    CPC .............. B29C 66/301; B29C 65/7802; B29C
                                65/7897; B29D 99/0025
    USPC .......................................................... 156/64
    See application file for complete search history.

FACILITY AND METHOD FOR PAIRING A SHIELD TO A PREFORM FOR THE PRODUCTION OF AN AIRCRAFT TURBINE ENGINE VANE

TECHNICAL FIELD OF THE INVENTION

The present invention relates to a facility and a method for pairing a shield on a preform for the production of an aircraft turbine engine vane.

TECHNICAL BACKGROUND

The technical background comprises in particular the document US-A1-2018/111332.

The use of composite materials is advantageous in the aeronautical industry in particular because these materials have interesting mechanical performances for relatively low masses.

One method for manufacturing a composite part for the aeronautical industry, which is well known to the person skilled in the art, is the moulding method RTM, the initials of which refer to the acronym Resin Transfer Molding.

This is a method for making a part from a composite material based on woven fibres and resin. Such a method is used, for example, to manufacture a turbine engine vane. A fibrous preform is produced and then placed in a thermo-compression mould. If the woven fibres are not previously impregnated with resin, a resin is injected into this mould. This preform is then heated so that the resin polymerises and forms a composite material preform.

In the case of manufacturing a vane, the composite material preform comprises a pressure side and a suction side which extend from a leading edge to a trailing edge of the composite material preform.

The composite material is relatively fragile, and in particular sensitive to impact, and it is known to be protected by means of a metal shield, also referred to as metal foil, which is fitted and attached to the leading edge of the composite material preform, for the purpose of producing the vane. It allows to protect the leading edge from erosion but also improves the strength of the vane against the ingestions (hail, gravel, debris, birds, etc.).

One way of attaching a shield to a preform is to bond the shield to the composite preform using an adhesive, after polymerisation of the resin in an operation referred to as pairing operation carried out manually by an operator.

Because pairing is done manually, it is very difficult to control or record the pairing parameters. All that matters is the distance between the position of a head of the shield and the preform. The associated measurement corresponds to the clearance between the shield and the preform at the level of the head of the shield, this clearance is also referred to as the "Tip Gap". This clearance is measured by the operator using a calliper. If the value is within the required tolerance, the assembly is considered good and complete, otherwise the operator continues to lower the shield until the required clearance measurement is reached.

Only the final result is checked and validated by measuring the clearance between the head of the shield and the preform. As a result, the method used to achieve the result is not monitored and remains largely dependent on the operator, i.e. the human factor, which means that the robustness of the assembly method cannot be guaranteed. As a result, the variability of the operation is very high.

As a result, the risk of non-quality is high and requires a high level of operator skill if it is to be controlled. Furthermore, as this non-quality is detected after the shield has been bonded to the preform, any defect cannot be rectified and the assembled vane will have to be scrapped.

Moreover, the manual operation is time-consuming.

In particular, the present invention is intended to solve in particular some or all of the above problems.

SUMMARY OF THE INVENTION

To this end, the invention proposes a pairing facility for pairing a metal shield on a leading edge of a composite material preform for the manufacture of an aircraft turbine engine vane, this facility comprising:
  a support configured to receive and hold the metal shield,
  a movement hexapod which carries said support and which is able to move the support along and around three axes of an XYZ coordinate system,
  an automaton comprising jaws configured to receive and hold the preform, and
  a computing unit for controlling the hexapod and the automaton with a view to producing the pairing.

The invention thus provides a facility allowing for automated assembly of the metal shield with the preform. More specifically, the facility of the invention allows the metal shield to be approached, positioned according to the pairing requirement and held on the preform in order to form a vane. This solution uses a parallel robot referred to as a hexapod, capable of following complex trajectories with a great precision, to cope with high assembly forces, and with high speed of movement. The shield to be assembled is positioned and attached on the support, itself installed on the hexapod. The preform, for its part, is positioned in jaws located on the automaton, and is placed above the hexapod, for example. For example, it will be stationary during assembly, meaning that only the hexapod comprising the shield moves to perform the pairing operation. The assembly trajectory can thus be drawn digitally, in particular on a computer software in the control computing unit, and correspond to the requirements deemed relevant for the pairing operation. In the present application, the computing unit is, for example, a computer.

The facility also allows the stop position to be finely controlled so that the tip gap to be achieved is perfectly respected. In particular, the assembly is held stationary by the automaton that holds the preform and the hexapod that holds the shield.

The automatic pairing offered by the facility according to the invention allows, in particular, to considerably reduce errors linked to the human factor, and to guarantee a repeatability and a reproducibility, giving a higher level of control. Moreover, the automation allows to cut the times of the pairing method, frees up the operator, reduces the cost of the operation and offers high-quality ergonomics.

In addition, the facility can be used to monitor and record the assembly parameters allowing to improve the control and the management of the pairing.

The pairing facility according to the invention may comprise one or more of the characteristics below, taken in isolation from one another or in combination with one another:
  the hexapod of movement comprises a base and a plate situated at a distance from the base and intended to receive said support, the plate and the base being connected to each other by at least three pairs of cylinders, the plate comprising at least three first points regularly distributed around an axis X which are connected to first ends of the cylinders, and the base comprising six second points around the axis X which are connected to second ends of the cylinders;

the base is horizontal and the plate is located above the base;

said support comprises a platform comprising a lower end attached to the hexapod and an upper end comprising a recess for receiving and holding the metal shield;

the facility also comprises at least one heating element carried by the automaton, such as an IR lamp;

the automaton comprises a gantry or a cabin at the center of which the movement hexapod is located; and the facility also comprises a tool for contactless, for example optical, measurement of a clearance left free between the leading edge of the preform and the shield after pairing.

The invention also relates to a method for pairing a metal shield on a leading edge of a composite material preform for the manufacture of an aircraft turbine engine vane, by means of a facility as described above, in which it comprises the steps of:

a) positioning the metal shield on the support, this metal shield having a generally dihedral shape and comprising two wings connected together and defining a space between them, the shield being held on the support so that said space faces upwards, b) gripping the preform by the jaws of the automaton, and c) pairing the shield on the preform so that a leading edge of the preform is engaged in said space.

The method according to the invention may comprise one or more of the characteristics below, taken alone with each other or in combination with each other:

comprises, between steps a) and b), a step consisting of:

i) attaching one end of the preform to an arm secured to the support, so that the preform extends close to the shield.

comprises, between steps i) and b), a step consisting of:

j) positioning the support on the hexapod.

comprises, before step c), a step consisting of:

k) applying an adhesive to the leading edge of the preform and/or to the shield.

comprises, after step k), a step consisting of:

l) heating the adhesive.

comprises, after step c), a step consisting of:

d) checking the pairing by measuring, at the level of one end of the preform, one dimension of a clearance left free between the leading edge of the preform and the shield.

step d) is carried out by a contactless measurement, for example an optical measurement.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
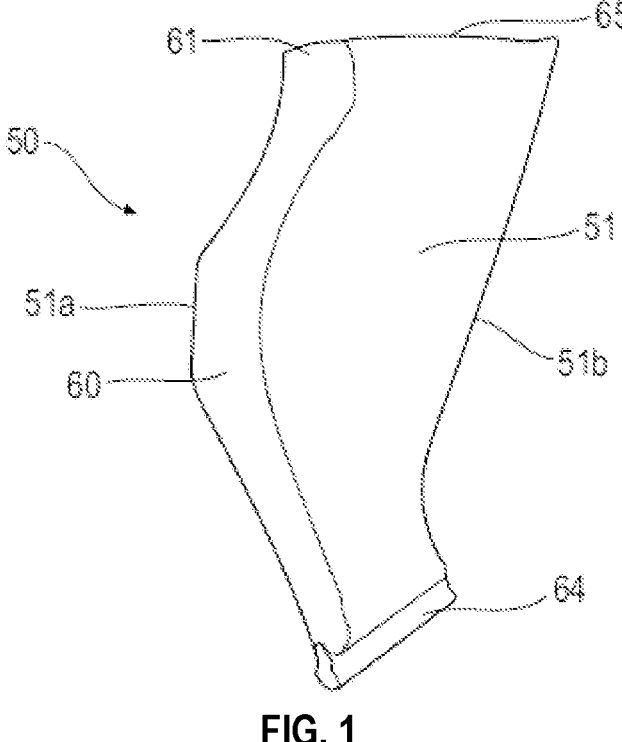
FIG. 1 is a schematic perspective representation of a vane formed by pairing a metal shield and a preform according to the invention.
Figure 2:
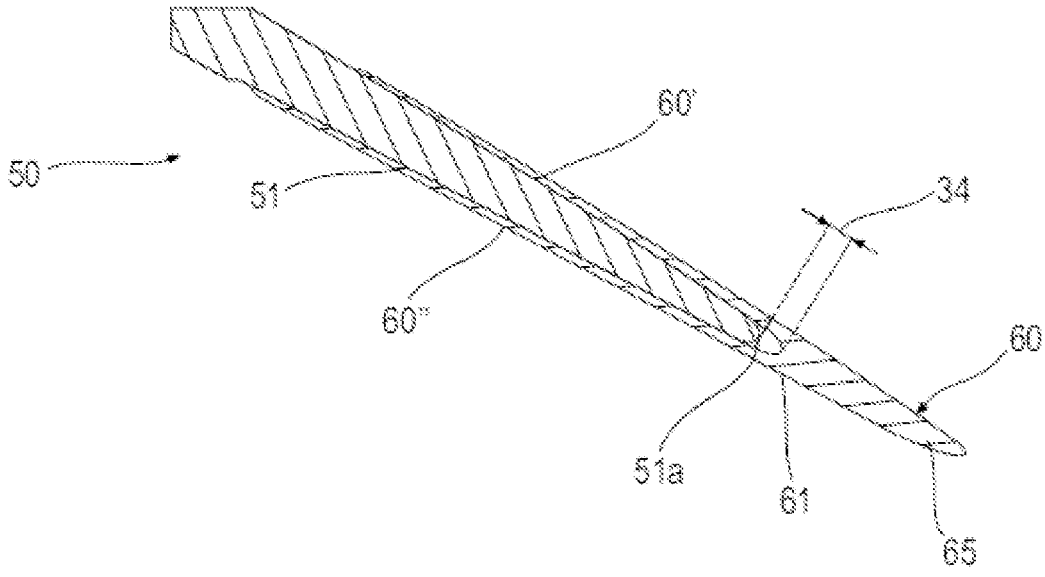
FIG. 2 is a schematic cross-sectional representation of a leading edge of the preform and the shield inserted around the preform.

We refer first of all to FIGS. 1 and 2 showing an aircraft turbine engine vane 50 manufactured using a pairing facility according to the invention. Such a vane 50 comprises a preform 51 made of composite material and a shield 60, in particular made of metal. The preform 51 consists in particular of a fibrous preform impregnated with a resin matrix. The shield 60 is also referred to as a foil and is used in particular to reinforce the vane 50. In particular, the vane extends from a vane root 64 to a vane head 65.

In particular, the preform 51 comprises a pressure side and a suction side which extend from a leading edge 51a to a trailing edge 51b of the preform.

The metal shield 60 has the general shape of a dihedron and comprises two wings 60', 60" connected together and defining between them a space in which the leading edge 51a of the preform 51 will be housed during a pairing method according to the invention.

The composite material preform 51 is made, for example, by placing a fibrous preform in a thermocompression mould.

The assembly formed by the shield 60 and the preform 51 forms the vane 50.

One of the parameters for checking the pairing corresponds to the measurement of a clearance 34, referred in particular as the "tip gap", left free between the leading edge 51a of the preform 51 and the shield 60 after pairing, a measurement which is taken in particular at the level of the head 61 of the shield 60 located opposite one end of the preform 51, referred to as the head of the preform 51.

Figure 3:
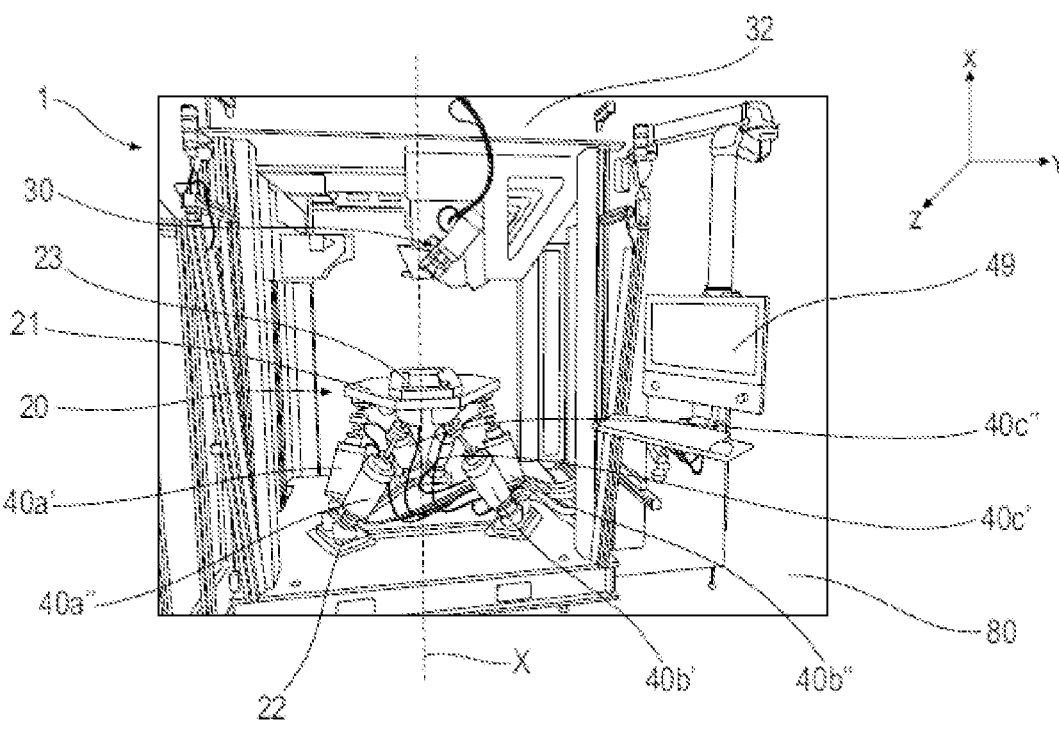
FIG. 3 is a schematic perspective representation of a facility for pairing a metal shield on a leading edge of a composite material preform according to the invention.

A facility 1 for pairing the metal shield 60 on the leading edge 51a of the composite material preform 51 for manufacturing the aircraft turbine engine vane 50 according to the invention is illustrated in FIG. 3. Pairing means precisely positioning two objects, in this case the metal shield 60, on the leading edge 51a of the composite material preform 51. The shield 60 and the preform 51 are attached in particular by means of an adhesive 55 positioned between the shield 60 and the preform 51, i.e. positioned on the shield 60 and/or the preform 51 prior to pairing.

The pairing facility 1 comprises in particular a support (referenced 10 in FIG. 5) configured to receive and hold the metal shield 60, a movement hexapod 20 carrying in particular the support 10, an automaton 30 and a computing unit 49 for controlling the hexapod 20 and the automaton 30 in order to produce the pairing.

As shown in FIGS. 3, 4, 5 and 6, the movement hexapod 20 is a mechanical system comprising six cylinders 40a', 40a'', 40b', 40b'', 40c', 40c'' allowing objects to be positioned and moved in six degrees of freedom, given by the cylinders 40a', 40a'', 40b', 40b'', 40c', 40c''. This type of system is known to the person skilled in the art and can be found on the market. This hexapod 20 allows a controlled movement to be generated everywhere in an XYZ coordinate system within the limits of the capacities of the facility, in other words, it allows the support 10 and therefore the shield 60 to be moved along and around three axes of the XYZ coordinate system.

The automaton 30 comprises jaws 31 configured to receive and hold the preform 51. The automaton 30 comprises a gantry 32 or a cabin at the center of which the movement hexapod 20 is located.

The movement hexapod 20 comprises a base 22 and a plate 21 located at a distance from the base 22 and designed to receive the support 10. The base 22 is horizontal and extends substantially perpendicular to an axis X. The axis X extends vertically with respect to the ground 80 on which the facility 1 is located. The plate 21 is located above the base 22 and extends substantially perpendicular to the axis X.

Figure 4:
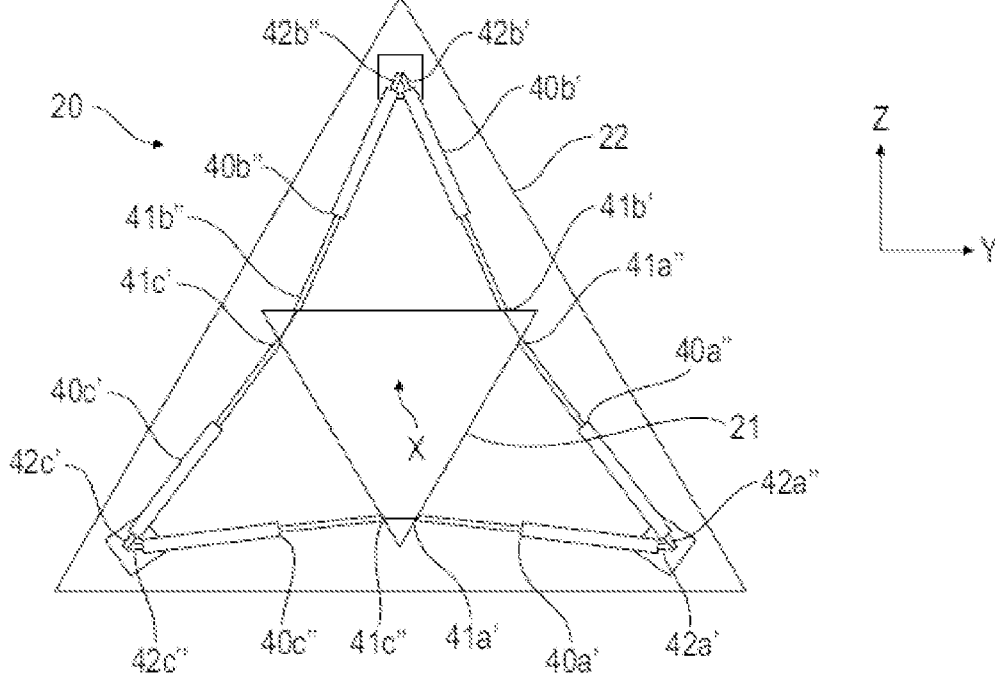
FIG. 4 is a schematic representation, seen from above, of a hexapod of the pairing facility according to the invention.

As shown in FIG. 4, the plate 21 and the base 22 are connected to each other by at least three pairs of cylinders 40a', 40a'', 40b', 40b'', 40c', 40c''. Each of these cylinders 40a', 40a'', 40b', 40b'', 40c', 40c'' comprises a first end 41a', 41a'', 41b', 41b'', 41c', 41c'' respectively, and a second end 42a', 42a'', 42b', 42b'', 42c', 42c'' respectively. The plate 21 comprises at least three first points, and for example six points, regularly distributed around the axis X which are connected to the first ends 41a', 41a'', 41b', 41b'', 41c', 41c'' of the cylinders 40a', 40a'', 40b', 40b'', 40c', 40c''. The base 22 comprises six second points around the axis X which are connected to the second ends 42a', 42a'', 42b', 42b'', 42c', 42c'' of the cylinders 40a', 40a'', 40b', 40b'', 40c', 40c''.

The movement hexapod 20 therefore comprises three pairs of cylinders 40a', 40a'', 40b', 40b'', 40c', 40c'', of which a first pair of cylinders 40a', 40a'', a second pair of cylinders 40b', 40b'' and a third pair of cylinders 40c', 40c'' can be distinguished.

A first and a second cylinder 40a', 40a'' of the first pair of cylinders 40a', 40a'' each comprise a first end 41a', 41a'', articulated to one of the at least three first points of the plate 21, and a second end 42a', 42a'', articulated to one of the six second points of the base 22. The second end 42a' of the first cylinder 40a' is located at the same level as the second end 42a'' of the second cylinder 40a''.

A third and a fourth cylinder 40b', 40b'' of the second pair of cylinders 40b', 40b'' each comprise a first end 41b', 41b'', articulated to one of the at least three first points, and a second end 42b', 42b'', articulated to one of the six second points. The second end 42b' of the third cylinder 40b' is located at the level of the second end 42b'' of the fourth cylinder 40b''.

A fifth and a sixth cylinders 40c', 40c'' of the third pair of cylinders 40c', 40c'' each comprise a first end 41c', 41c'', articulated to one of the at least three first points and a second end 42c', 42c'', articulated to one of the six second points. The second end 42c' of the fifth cylinder 40c' is located at the level of the second end 42c'' of the sixth cylinder 40c''.

The cylinders 40a', 40a'', 40b', 40b'', 40c', 40c'' are inclined in particular with respect to the plate 21 or to the base 22.

Figure 5:
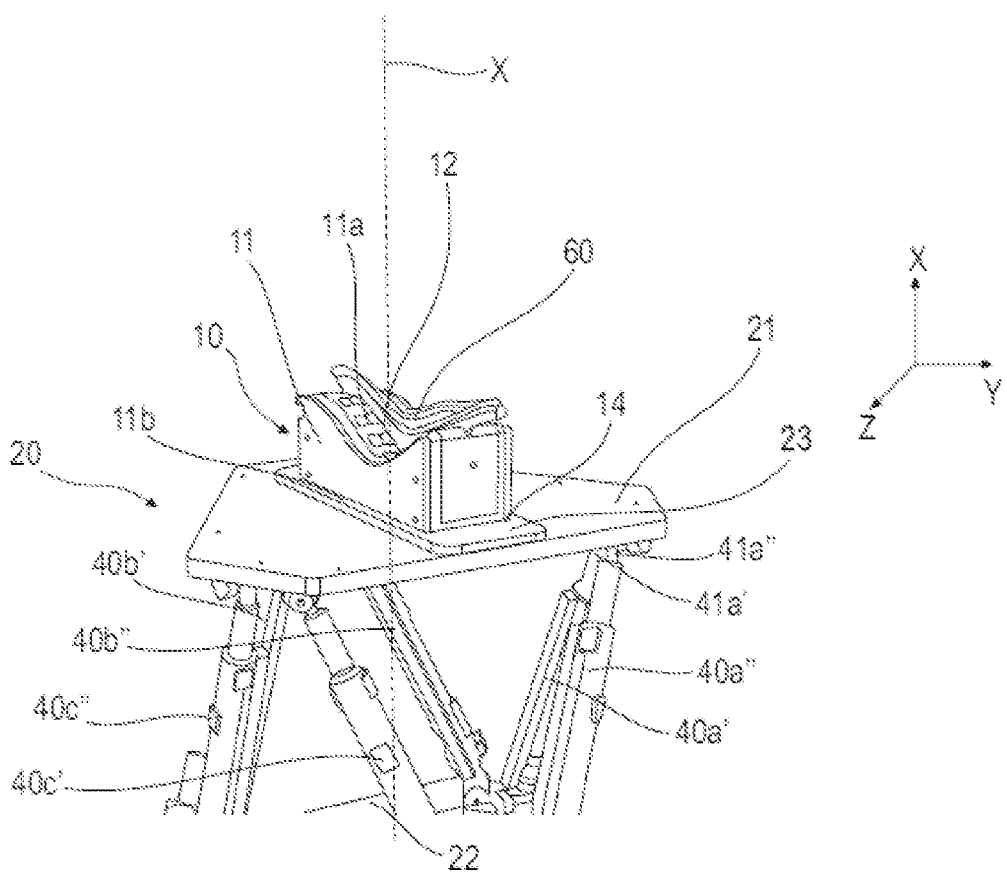
FIG. 5 is a schematic perspective view of a metal shield installed on a support arranged on the hexapod.
Figure 6:
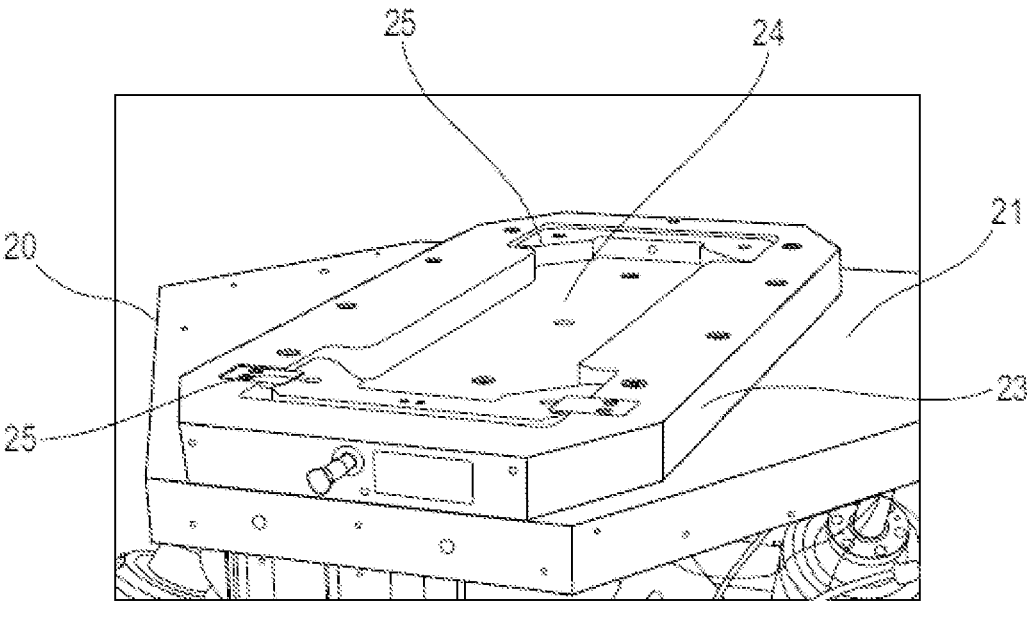
FIG. 6 is a schematic perspective view of a device for centring and clamping the support installed on the hexapod.

As shown in FIG. 5, the support 10 comprises a platform 11 comprising a lower end 11b and an upper end 11a. The upper end 11a comprises a recess 12 for receiving and holding the metal shield 60. The lower end 11b comprises a plate 14 attached to the hexapod 20, more precisely attached to the plate 21 of the hexapod 20. In particular, the lower end 11b is attached to a centring and clamping device 23 allowing for centring and clamping the support 10. The device 23, in particular shown in FIG. 6, is fitted to the plate 21 of the hexapod 20. The device 23 comprises a cavity 24 allowing for centring the support 10. The device 23 comprises, for example, a clamping system 25 comprising jaws in particular, allowing the support 10 to be clamped to the hexapod 20.

In particular, the computing unit 49 can be used to create a customised trajectory, in particular by drawing the theoretical assembly trajectory on computer-aided design (CAD) software, more precisely by drawing a sequence of points. This trajectory allows to comply with dedicated requirements or to adapt to the preform 51, to the shield 60, to the adhesive 55 and/or to any other parameter deemed relevant for the pairing. In particular, the purpose of the trajectory is to ensure that there is no contact between the shield 60 and the preform 51, so as to guarantee zero or as low a force as possible during the approach phase. The precision of the trajectory is linked to the resolution of the step, i.e. the distance between two points making up the movement, allowing a precise control to arrive at the stop position. This precision allows to obtain a perfect measurement of the clearance 34, allowing the pairing requirements between the shield 60 and the preform 51 to be met.

The computing unit 49 can also be used to allow to control the force required to correctly press the shield 60 onto the preform 51, also known as force compensation. The computing unit 49 can adapt the movement of the hexapod 20 to reduce the force with which the shield 60 is pressed against the adhesive 55, so that the actual movement trajectory deviates from the theoretical movement trajectory. The points on the trajectory remain unchanged, but the movement between two points can therefore automatically deviate from the theoretical trajectory, as this reduces the effort. This force compensation allows to reduce the impact of the contact of the preform 51 on the adhesive film 55 and the shield 60, in particular the stress loading on the latter.

You can choose the point on the trajectory at which this compensation will take effect. In fact, it is not at all necessary in the first moments of movement when the shield 60 and the adhesive 55 are not yet in contact. In this way, the facility 1 endeavors to reduce the impact on the preform 51, the adhesive 55 and the shield 60, in particular the stress loading of the latter. The accumulated stresses may deform the preform 51, the adhesive film 55 or the shield 60 during the pairing, i.e. when the shield 60 is pressed onto the preform 51. Furthermore, once the stresses have been released, i.e. once the hold has been released, in particular during transfer of the vane 50 in the case of polymerisation carried out subsequently and outside the assembly machine, these stresses may lead to displacements, in particular the displacement of the shield 60 relative to the preform 51, which may thus affect the size of the clearance 34. The force compensation proposed by the invention therefore generates a specific trajectory for each part, allowing to compensate for the displacements of the shield 60 relative to the preform 51 due to the release of the stresses.

An alternative embodiment involves recording all the trajectories carried out in order to obtain a "learning" for defining an average trajectory that replaces the theoretical trajectory produced by the CAD software. In this way, the force compensation and the movements of the hexapod 20 are minimised, making the facility 1 more efficient.

Figure 7:
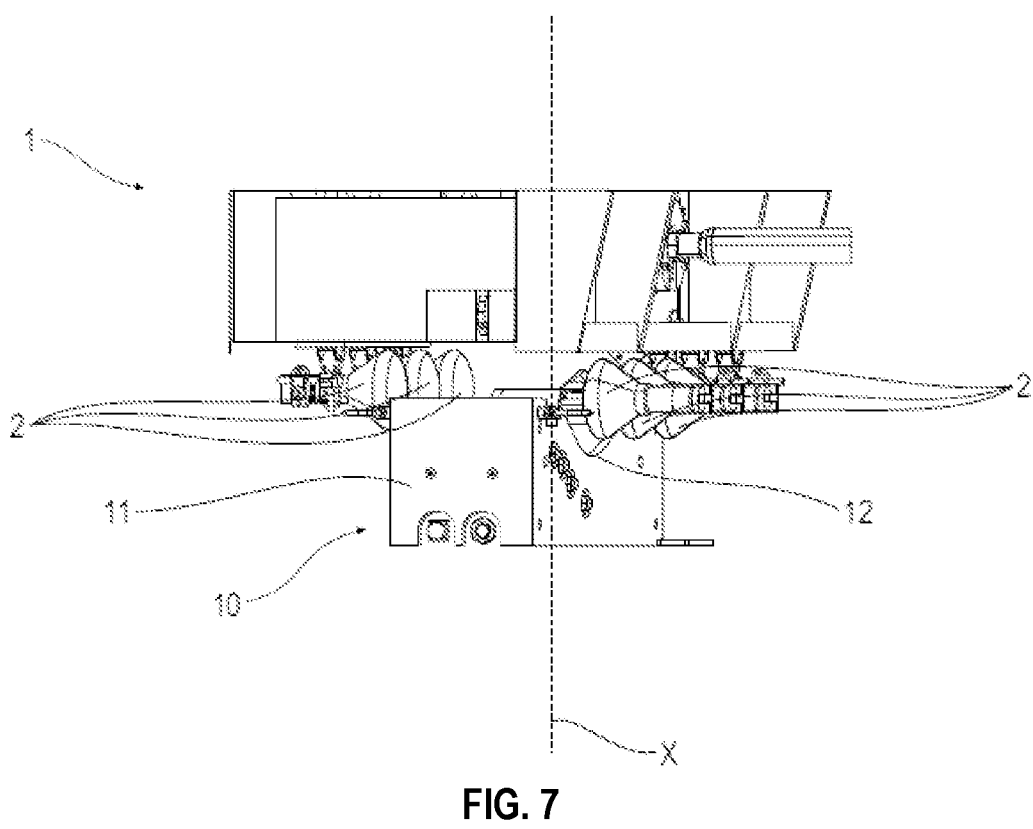
FIG. 7 is a schematic perspective representation of a heating system of the pairing facility according to the invention.
Figure 8:
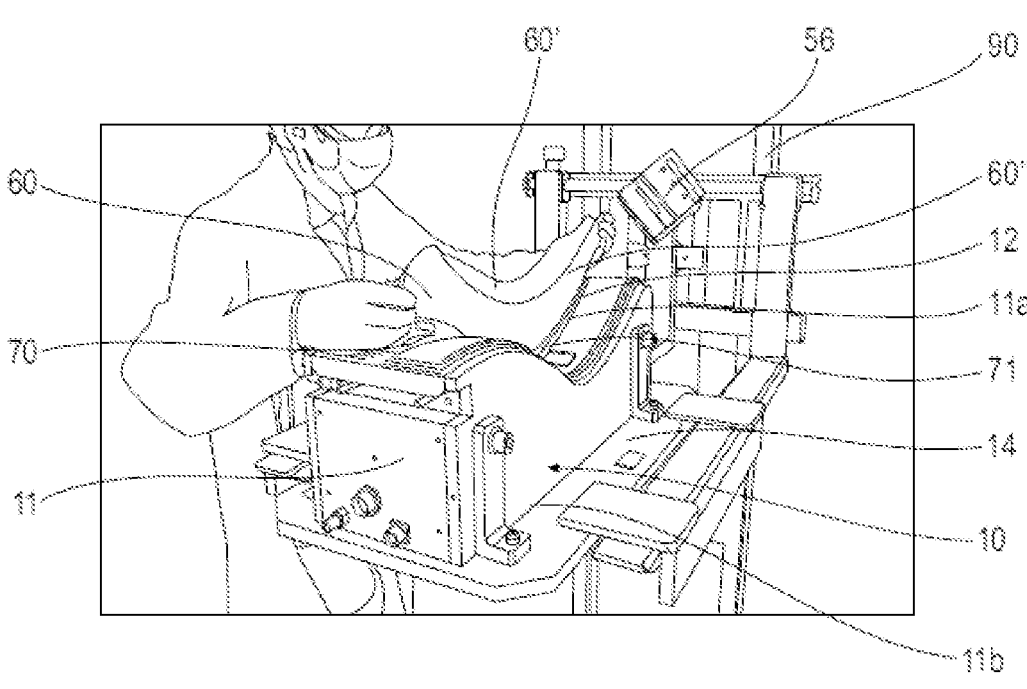
FIG. 8 is a schematic perspective view of the support and of the shield.
Figure 9:
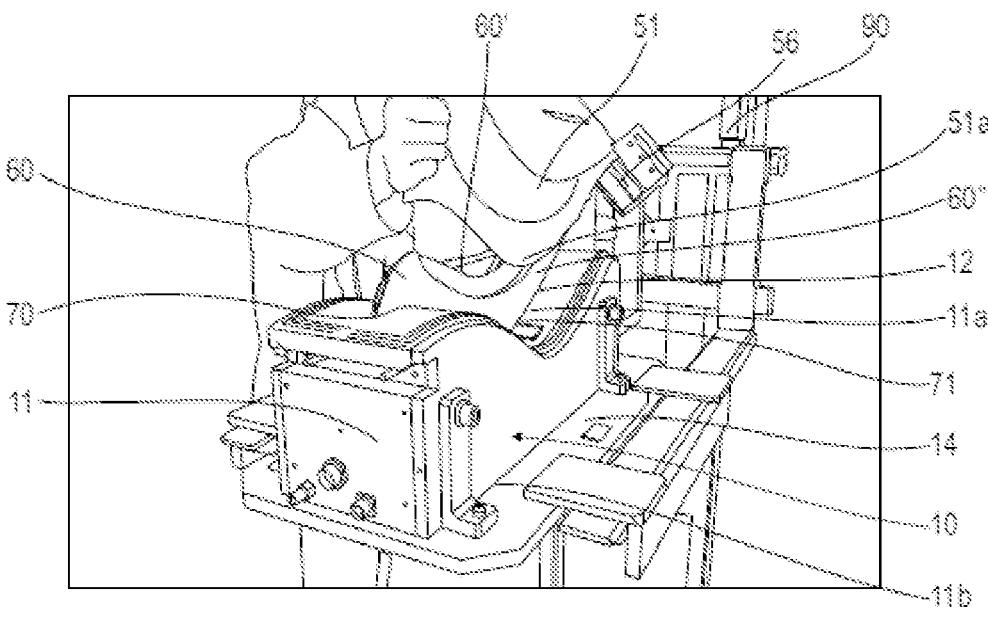
FIGS. 9 and 10 are schematic perspective views of the support and of the shield.
Figure 10:
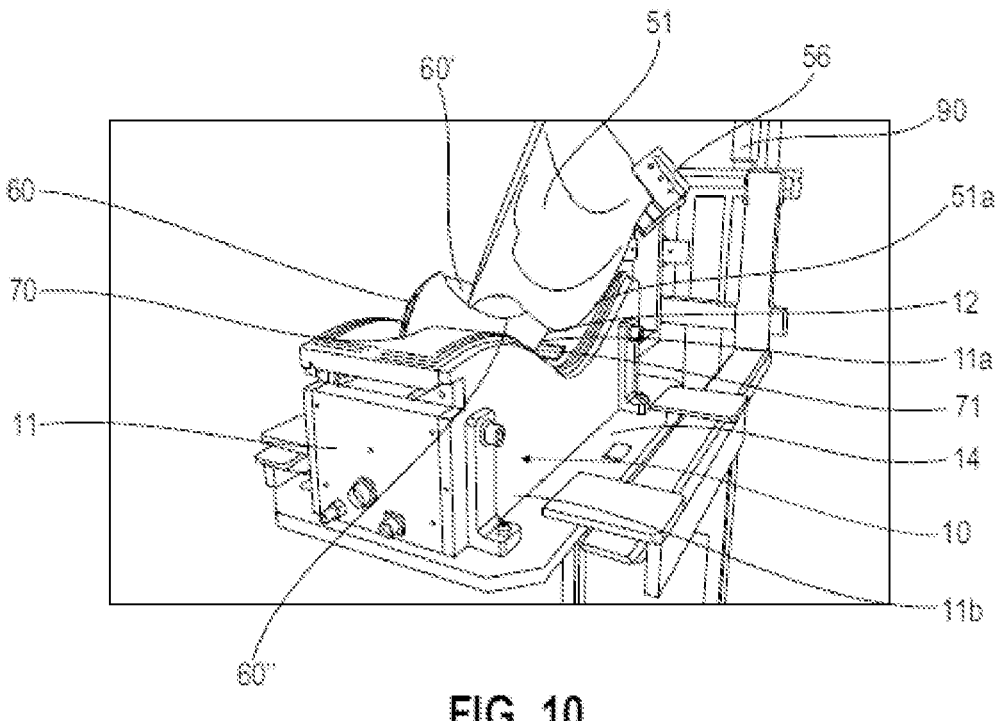
Figure 11:
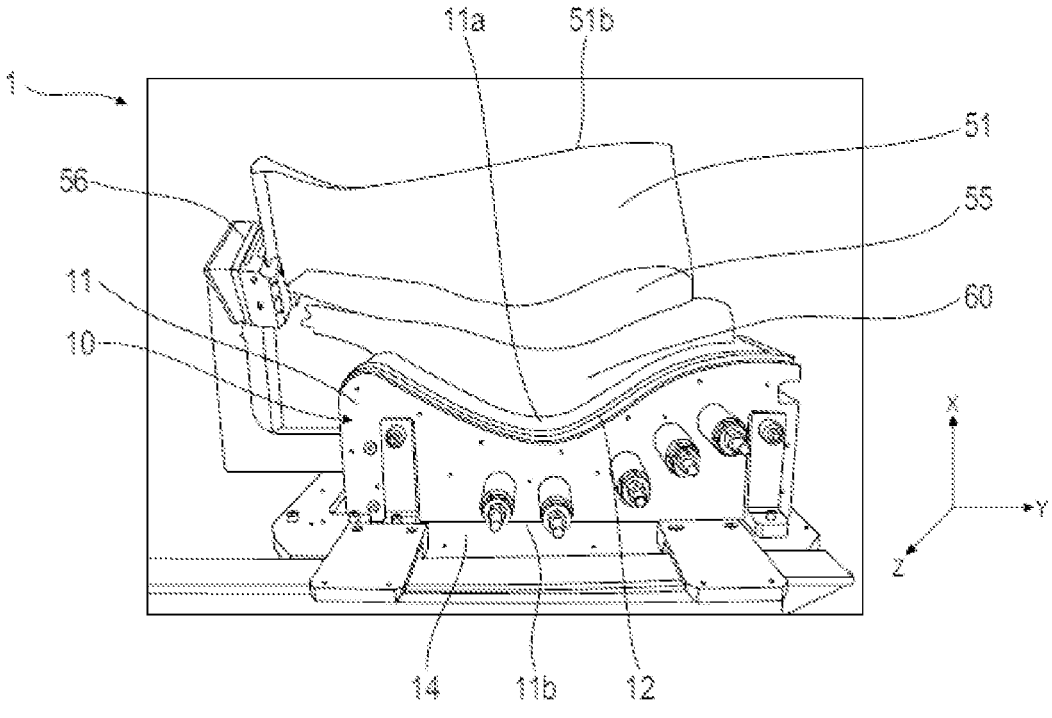
FIG. 11 is a schematic perspective view of the preform.
Figure 12:
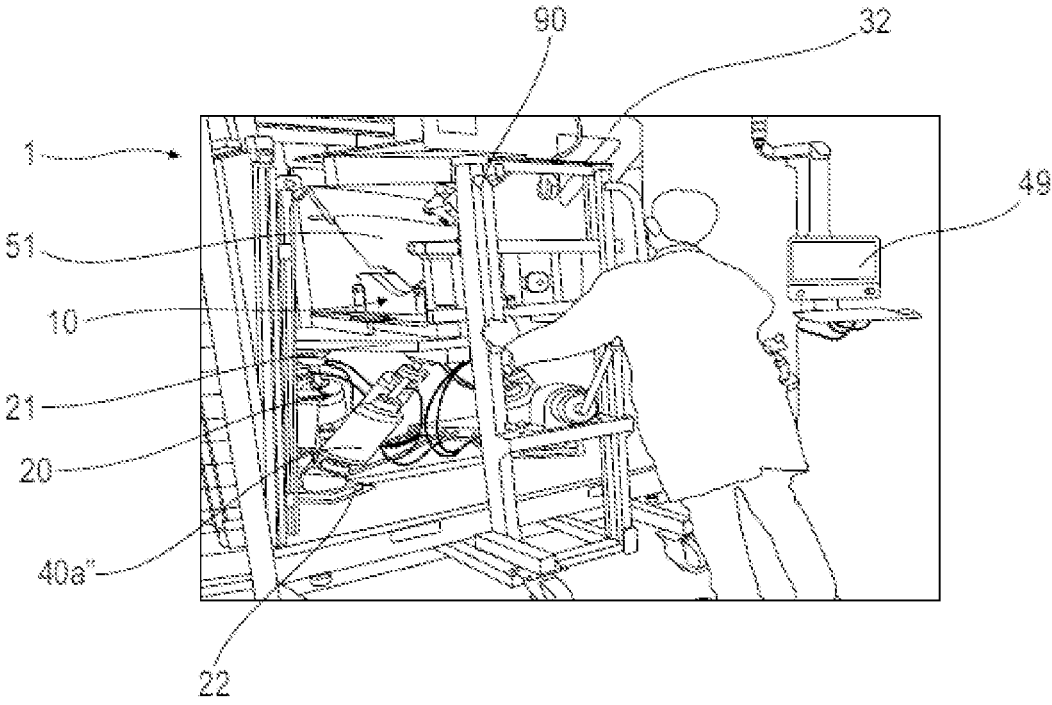
FIG. 12 is a schematic perspective view of the pairing facility according to the invention when the support, the shield and the preform are loaded.
Figure 13:
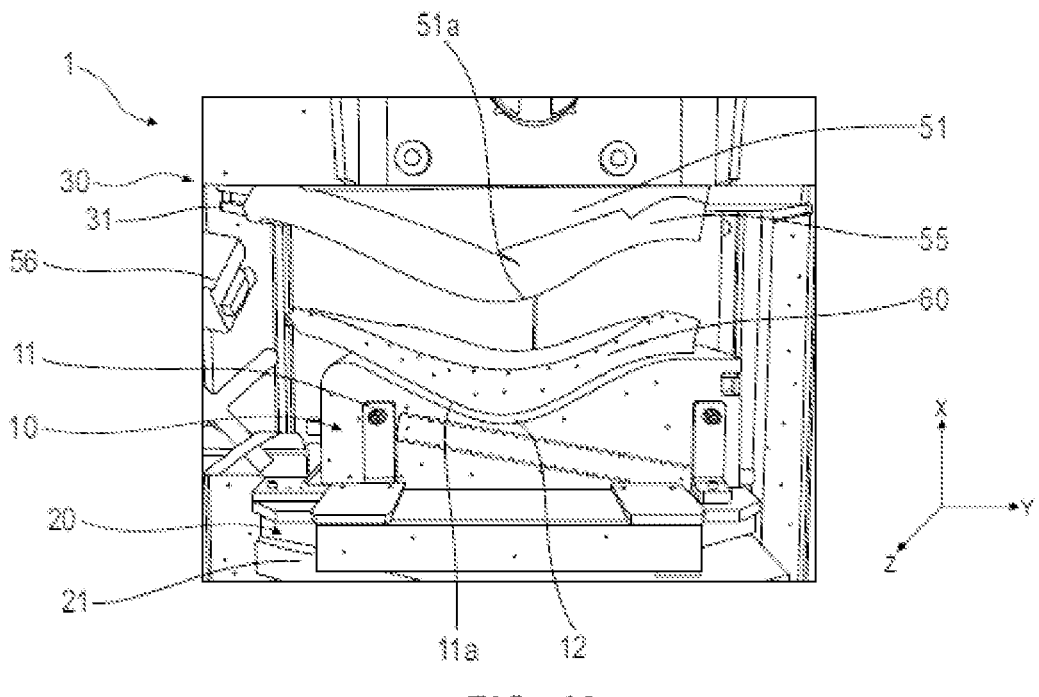
FIGS. 13 and 14 are schematic perspective views of the facility according to the invention during pairing of the shield with the preform.
Figure 14:
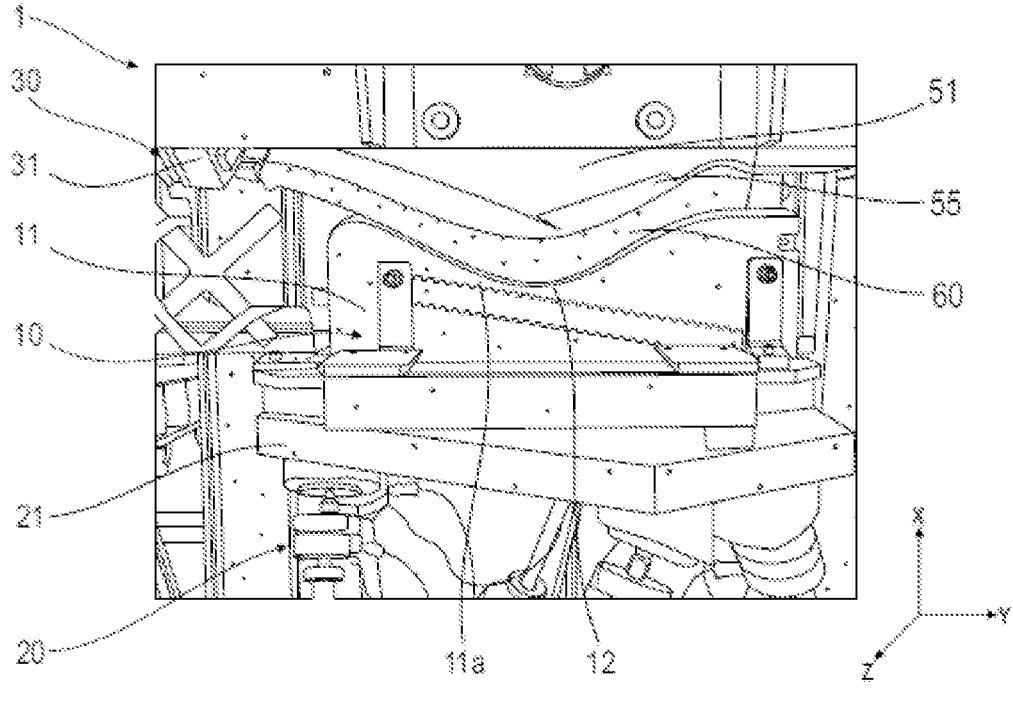
Figure 15:
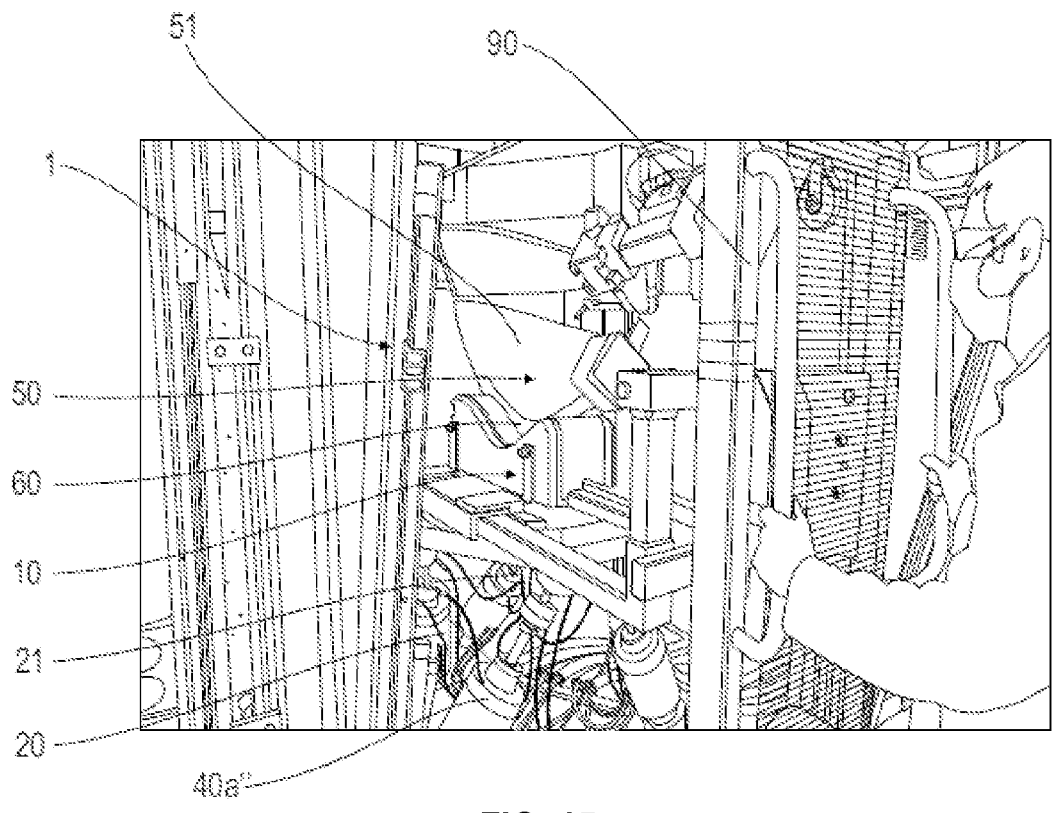
FIG. 15 is a schematic perspective representation of the pairing facility according to the invention at the time of unloading the support, the shield and the vane.

As shown in FIG. 7, the pairing facility 1 comprises, for example, at least one heating element 2 carried in particular by the automaton 30, such as an IR infrared lamp, in particular several IR infrared lamps. The lamp or lamps with infrared IR radiation can therefore be positioned close to the shield 60, particularly on either side of the latter. In particular, the computing unit 49 is used to control the heating function of the facility 1, in particular its triggering and also its power according to the requirements of the method. In particular, heating the adhesive 55 allows to reduce the viscosity of the adhesive 55 and thus reduces the effort required to assemble the shield 60.

In particular, the presence of the heating element 2 means that the operator does not have to apply a hot air gun directed at the leading edge, while guaranteeing better and more consistent heating of the adhesive 55.

The automaton 30 comprises a contactless measurement tool (not shown), for example an optical one. The contactless measurement tool can, for example, measure the clearance 34 in real time, allowing the pairing to be controlled directly by this value and no longer by the trajectory points defined by the CAD software, as explained previously.

Figure 16:
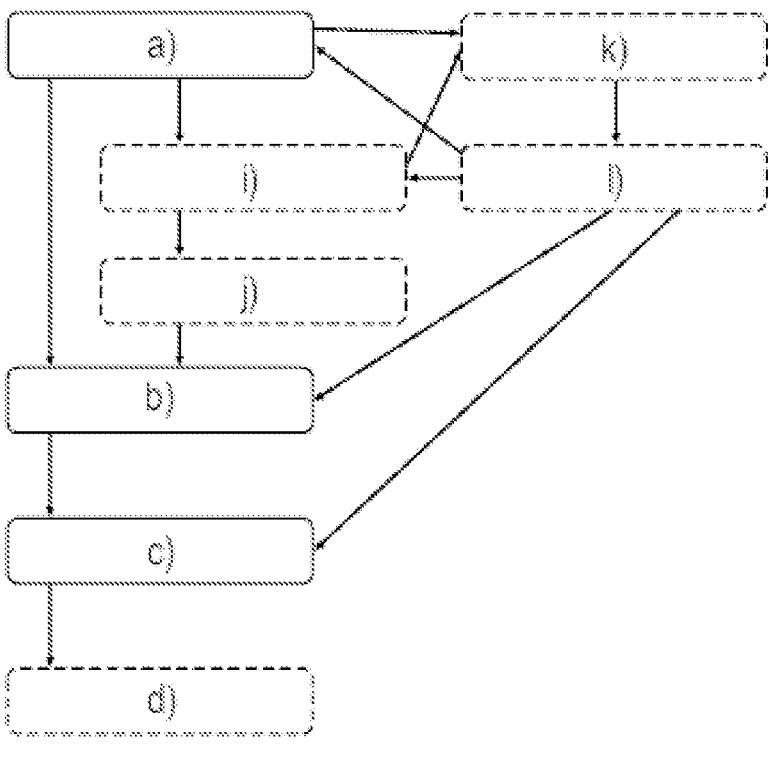
FIG. 16 is a flow chart representing the various steps of a pairing method according to the invention.

As shown in FIGS. 8 to 15 and in the flow chart in FIG. 16, the invention also relates to a method for pairing the metal shield 60 on the leading edge 51a of the composite material preform 50 for manufacturing the aircraft turbine engine vane 50, by means of the facility 1 as described above.

In particular, the method comprises a step a) (FIG. 8) consisting of positioning the metal shield 60 on the support 10. The shield 60 is positioned and held on the support 10 so that the space faces upwards. The position is ensured in particular by the abutments 70 and clamping 71 with clamps which in particular have a contact surface with a profile complementary to the profile of the shield 60. This position (FIG. 9) is definitive and significant for the rest of the assembly. At this point, the support 10 is positioned on a mobile carriage 90, for example, but could also already be in the facility 1.

For example, the method also comprises a step i) (FIGS. 9, 10 and 11), between step a) and a step b), consisting in attaching one end of the preform 51 to an arm 56 secured to the support 10, so that the preform 51 extends close to the shield 60.

In particular, the method comprises a step j) (FIG. 12), between step i) and step b), consisting of positioning the support 10 on the hexapod 20, in particular on the centring and clamping device 23, which allows to guarantee the position of the support 10 in the pairing facility 1. The support 10 can be positioned/loaded in the facility 1 either manually or automatically, for example by means of a robotic arm. Similarly, the support 10 can be attached or clamped to the hexapod 20 manually or automatically, in particular by means of a hydraulic cylinder.

The method also comprises a step b) (FIG. 12) in which the preform 51 is gripped by the jaws 31 of the automaton 30. If the preform 51 has been attached to the arm 56 (step i), the preform 51 will, for example, be automatically placed in the jaw 31 of the automaton 30 when step b) is carried out.

The method also comprises a step c) (FIGS. 13 and 14) which involves the pairing of the shield 60 on the preform 51 so that the leading edge 51a of the preform 51 is engaged in the space. During this step, the shield 60 is engaged thanks to the movement of the hexapod 20, which is able to move according to the three translational movements and the three rotational movements as explained above. The hexapod 20 moves along the selected trajectory and then stops at the selected stopping point to meet the required clearance 34 or is guided by the contactless measurement tool.

In particular, the method comprises a step k), prior to step c), consisting of applying the adhesive 55 to the leading edge 51a of the preform 51 and/or to the shield 60.

For example, the method comprises a step l) after step k) consisting of heating the adhesive 55, in particular using the heating element 2 as explained above.

In particular, the method comprises a step d), after step c), consisting in checking the pairing by measuring, at the level of one end of the preform 51, a dimension of the clearance 34 left free between the leading edge 51a of the preform 51 and the shield 60. This measurement is carried out in particular by a contactless measurement, for example an optical measurement as explained above.

The method also comprises a step e) of unloading (FIG. 15) the assembly, which consists of recovering the support 10 with the assembled vane 50 following a reverse procedure to the loading in step j).

In this way, the assembly automation can be parameterised, making the pairing method according to the invention precise, repeatable and reproducible while reducing the time needed to carry it out. The pairing requires little or no action on the part of the operator, as everything is automatic, with the adhesive heating function and force compensation integrated into the facility.

The invention claimed is:

1. A pairing facility for pairing a metal shield on a leading edge of a composite material preform for manufacturing an aircraft turbine engine vane, said facility comprising:
   a support configured to receive and hold the metal shield,
   a movement hexapod which carries said support and which is able to move the support along and around three axes of an XYZ coordinate system,
   an automaton comprising jaws configured to receive and hold the preform, and
   a computing unit for controlling the hexapod and the automaton with a view to producing the pairing.

2. The facility according to claim 1, wherein the movement hexapod comprises a base and a plate situated at a distance from the base and intended to receive said support, the plate and the base being connected to each other by at least three pairs of cylinders, the plate comprising at least three first points regularly distributed around an axis which are connected to first ends of the cylinders, and the base comprising six second points about the axis which are connected to second ends of the cylinders.

3. The facility according to claim 2, wherein the base is horizontal and the plate is located above the base.

4. The facility according to claim 1, wherein said support comprises a platform comprising a lower end attached to the hexapod and an upper end comprising a recess for receiving and holding the metal shield.

5. The facility according to claim 1, wherein it also comprises at least one heating element carried by the automaton.

6. The facility according to claim 1, wherein the automaton comprises a gantry or a cabin at the center of which said movement hexapod is located.

7. The facility according to claim 1, wherein said facility further comprises a tool for contactless measurement of a dimension of a clearance left free between the leading edge of the preform and the shield after pairing.

8. A method for pairing a metal shield on a leading edge of a composite material preform for manufacturing an aircraft turbine engine vane, by means of a facility according to claim 1, wherein the method comprises the steps of:

a) positioning the metal shield on the support, this metal shield having the general shape of a dihedron and comprising two wings connected together and defining a space between them, the shield being held on the support so that said space is oriented upwards, b) gripping the preform by the jaws of the automaton, and c) pairing the shield on the preform so that a leading edge of the preform is engaged in said space.

9. The method according to claim 8, comprising, between steps a) and b), a step of:

i) attaching one end of the preform to an arm secured to the support, so that the preform extends close to the shield.

10. The method according to claim 9, comprising, between steps i) and b), a step of:

j) positioning the support on the hexapod.

11. The method according to claim 8, comprising, before step c), a step of:

k) applying an adhesive to the leading edge of the preform and/or to the shield.

12. The method according to claim 11, comprising, after step k), a step of:

l) heating the adhesive.

13. The method according to claim 8, comprising, after step c), a step of:

d) checking the pairing by measuring, at one end of the preform, a dimension of a clearance left free between the leading edge of the preform and the shield.

14. The method according to claim 13, wherein step d) is carried out by a contactless measurement.

15. The method according to claim 13, wherein step d) is carried out by an optical measurement.

* * * * *